April 3, 1934.  C. H. KINDL ET AL  1,953,178

SHOCK ABSORBER

Filed May 29, 1933   2 Sheets-Sheet 1

Inventors
CARL H. KINDL
EDWIN F. ROSSMAN
RALPH I. BATES

By Spencer, Hardman and Hehr
Attorneys

April 3, 1934.  C. H. KINDL ET AL  1,953,178

SHOCK ABSORBER

Filed May 29, 1933   2 Sheets-Sheet 2

Inventors
CARL H. KINDL
EDWIN F. ROSSMAN
RALPH I. BATES

By Spencer, Hardman and Fehr
Attorneys

Patented Apr. 3, 1934

1,953,178

UNITED STATES PATENT OFFICE 1,953,178

SHOCK ABSORBER

Carl H. Kindl, Edwin F. Rossman, and Ralph I. Bates, Dayton, Ohio, assignors to The Delco Products Corporation, Dayton, Ohio, a corporation of Delaware Application May 29, 1933, Serial No. 673,396

16 Claims. (Cl. 188—88)

This invention relates to improvements in hydraulic shock absorbers adapted to control the relative movements of the frame and axles of a vehicle.

It is among the objects of the present invention to provide an hydraulic shock absorber capable of adjusting itself automatically in accordance with the nature of the roadway over which the vehicle is being operated.

A further object of the invention is to provide an automatically adjusted shock absorber with a manual control device whereby the operator may adjust the shock absorber to provide various degrees of resistance in accordance with his own desires.

Further objects and advantages of the present invention will be apparent from the following description, reference being had to the accompanying drawings, wherein a preferred embodiment of one form of the present invention is clearly shown.

Figure 1:
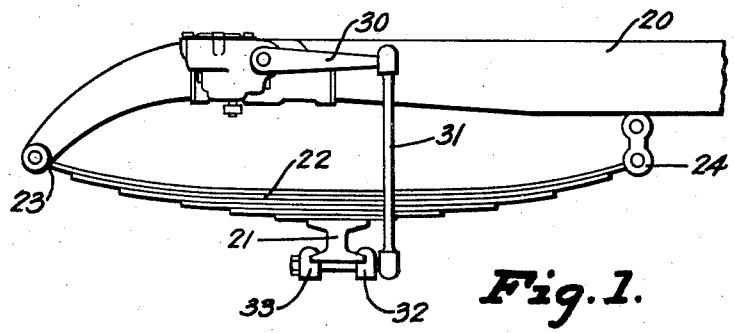
Fig. 1 is a fragmentary side view of a vehicle chassis, a shock absorber equipped with the present invention being shown applied to the frame of the chassis and connected with the axle. The road wheels have been omitted for the sake of clearness.

Referring to the drawings, the numeral 20 designates the frame of the vehicle which is supported upon the vehicle axle 21 by a spring 22 hingedly attached to the frame at points 23 and 24 respectively.

The shock absorber comprises a casing 25 providing a fluid reservoir 26 and a cylinder 27. The open ends of the cylinder 27 are closed by cylinder end caps 28 having suitable gaskets to prevent leaks. Journalled transversely of the casing 25 is a rocker shaft 29, one end of which extends outside the shock absorber casing and has the shock absorber operating arm 30 provided thereon. The free end of this arm 30 is swivelly attached to one end of a link 31, the opposite end of said link being swivelly secured to a member 32 anchored to the axle 21 by the clamping member 33. Within the shock absorber casing 25 shaft 29 has a rocker lever 34 attached thereto so that said lever will rotate with said shaft.

Within the cylinder a piston 35 is reciprocably carried, said piston comprising head portions 36 and 37 which form spring rebound and spring compression control chambers 38 and 39 respectively. The free end of lever 34 extends into a recess provided in the piston 35 between piston head portions 36 and 37, said arm engaging wear pieces 40 carried in adjacent, inner ends of the respective piston head portions.

From the aforegoing it may be seen that as the rocker lever 34 is oscillated back and forth by the rotation in one direction or the other of shaft 29, piston 35 will be reciprocated within the cylinder 27.

Each piston head portion 36 and 37 has a passage 42 therethrough providing for the transfer of fluid from one side of the piston to the other, or more specifically between the reservoir and the respective control chambers 38 and 39. Each piston head passage 42 has a fluid flow control device, and inasmuch as both devices for both piston head portions are alike, only one will be described detailedly.

Figure 3:
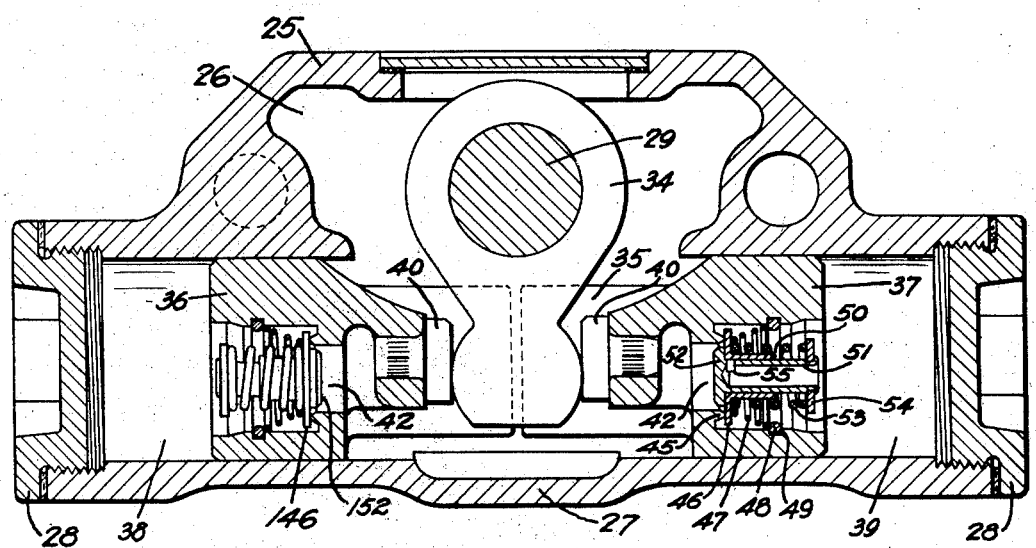
Fig. 3 is a longitudinal sectional view taken through the cylinder of the shock absorber.

Referring to the piston head portion 37, it will be seen that an annular ridge 45 surrounds the opening of passage 42 more adjacent the chamber 39, this annular ridge providing a valve seat for the intake valve 46 which is urged upon this seat by spring 47 interposed between the valve and an abutment ring 48 seated within a groove 49 provided in the piston head. The tubular body 50, of intake valve 46, slidably carries the tubular body portion 51 of the pressure relief valve 52, which is urged into seating engagement with the intake valve 46 by spring 53 interposed between the intake valve and an abutment collar 54 secured to the outer end of the tubular body portion 51 of pressure relief valve 52. An opening 55, in the tubular body portion 51 of the pressure release valve, normally lies within the confines of the intake valve 46, as shown in Fig. 3, however to establish a fluid flow through the pressure release valve it must move relative to the intake valve 46 so that the side opening 55 is uncovered. Details of the operation of this valve will be described later.

From the aforegoing it may be seen that communication between the reservoir 26 and the respective chambers 38 and 39 may be obtained through the piston passages 42 dependent of course upon the movement of the piston. Other communications between the compression chamber 38 and the reservoir 26 are obtained through ducts or passages provided in the casing 25.

Figure 2:
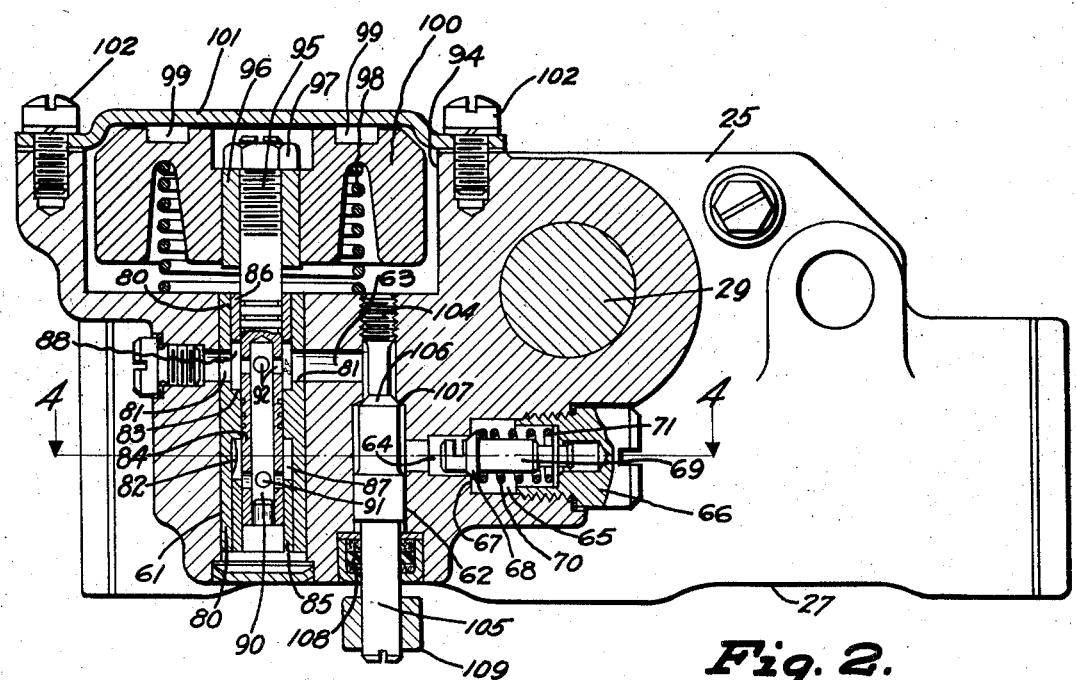
Fig. 2 is a fragmentary sectional view taken from the side of the shock absorber, showing certain fluid flow control devices thereof.
Figure 4:
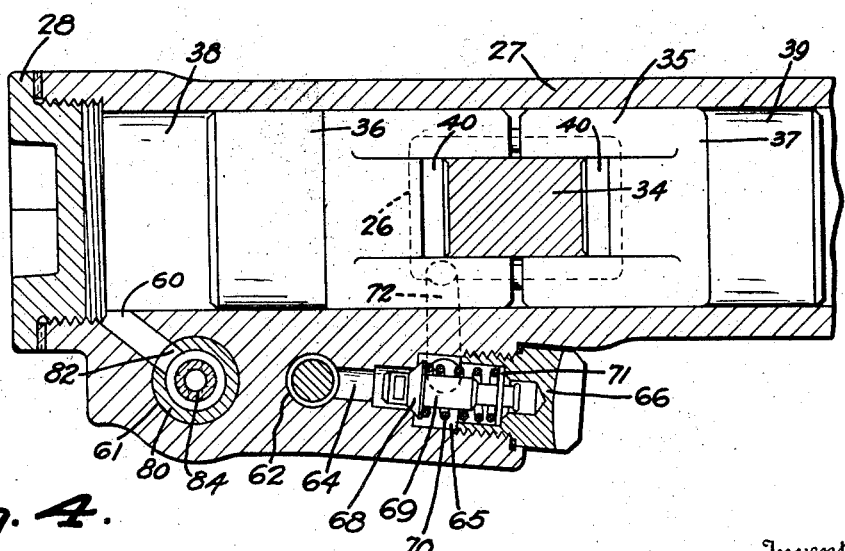
Fig. 4 is a fragmentary sectional view taken substantially along the line 4—4 of Fig. 2.

Referring more particularly to Figs. 2 and 4, chamber 38 has a duct or passage 60 leading therefrom into the recess 61 provided in the shock absorber casing. This recess 61 receives and houses the automatic fluid flow control device of the shock absorber. Another recess 62 in the shock absorber casing and substantially parallel to recess 61 is in communication with said recess 61 through a cross passage 63. Another cross passage 64 leads from recess 62 into a valve chamber 65, the outer end of which opens to the outside of the shock absorber and is interiorly threaded to receive the screw plug 66. The difference in diameter between the valve chamber 65 and the cross passage 64 forms a shoulder 67 which provides a seat for the flange 68 of the check valve 69, this flange being urged upon its seat by spring 70 interposed between the flange 68 of the valve 69 and an abutment collar 71 carried by the valve and engaging the screw plug 66 when the valve is properly assembled in the shock absorber casing. The valve chamber 65 in turn is in communication with the reservoir 26 of the shock absorber through a passage 72 shown in dotted lines in the Fig. 4. Passage 72 discharges into the reservoir 26 at a point which at no time will be covered by any portion of the piston so as to prevent communication between the reservoir and the valve chamber 65.

The automatic fluid flow control device of the shock absorber or more specifically the fluid flow control device which is operated in accordance with accelerations in the shock absorber movements in one direction is contained within the recess 61 as has been mentioned heretofore. In recess 61 there is first placed a sleeve 80 so as to be immovable therein, sleeve 80 having side openings 81 which communicate with the cross passage 63 and also an opening 82 providing communication between the interior of sleeve 80 and the duct or passage 60 leading from the spring rebound control chamber 38. Within the sleeve 80 there is provided an inwardly extending annular flange 83 which forms a bearing for the slide valve 84. A tube 85 within sleeve 80 provides another bearing for the slide valve 84 at one end of sleeve 80 and a similar tube 86 provides a similar bearing at the opposite end of sleeve 80 for the slide valve. It will be seen that tubular bearings 85 and 86 are spaced from the flange 83 in the sleeve 86 so as to provide chambers 87 and 88 respectively between the slide-valve 84 and the sleeve 80. Chamber 87 is in communication with the opening 82 in sleeve 80 and chamber 88 is in communication with the side openings 81 in said sleeve 80. The slide valve 84 has an interior chamber 90, closed at both ends, one end of which is in communication with the chamber 87 through openings 91 in the wall of the hollow sleeve-valve 84, other openings 92 providing communication between the inner chamber 90 of the sleeve-valve and the chamber 88 in the sleeve 80. The sleeve-valve 84 extends from the sleeve 80 into an enlarged chamber or recess 94 in the casing, which recess or chamber contains the inertia mass or weight 100. The sleeve-valve 84 is secured to this weight 100 in any suitable manner, in the present instance the threaded end 95 of sleeve-valve 84 threadedly engages an interiorly threaded collar 96 which is secured to the weight 100 in any suitable manner. A lock nut 97 maintains the sleeve-valve to the collar 96 in properly adjusted position. A spring 98 resting upon the bottom surface of the recess 94 yieldably holds the weight 100 in suspension. In order to prevent upward movement of this weight away from normal position, bumper blocks 99 are provided in the weight which are adapted normally to engage the cover plate 101 secured to the casing by screws 102. The normal position of the weight 100 maintains the sleeve-valve 84 in such a position that openings 92 are in communication with chamber 88, and openings 91 with chamber 87.

The recess 62 is interiorly threaded to receive the threaded end 104 of the manually adjustable valve 105. This valve has a tapered portion 106 adapted through rotation of the valve to be moved toward or away from the seat 107 whereby the orifice presented between the tapered portion 106 and the valve seat 107 may be varied through the rotation of the valve 105. A proper gasket 108, of any suitable design, provides a packing in the casing about the valve to prevent leaks. An operating lever 109 is attached to the manually operable valve 105 so that said valve may be rotated, through any suitable connections, by the operator of the vehicle at any time desired, to adjust the orifice and provide shock absorber resistance as he desires. The connections with lever 109 may be made to any suitable operating lever on the dash of the vehicle which would be within easy reach of the operator during operation of the vehicle.

The device functions in the following manner:

The roadwheels of the vehicle, upon striking an obstruction or raise in the highway, will be thrust upwardly toward the frame 20, thereby causing upward movement of the axle 21 and compression of springs 22. As the axle 21 moves toward the frame 20, the link connection between the axle and shock absorber piston 35 will cause said piston to be moved toward the right as regards the drawings, thereby exerting a pressure upon the fluid within the chamber 39 which pressure, when sufficient, will move valve 52 so as to bring its side opening 55 outside the confines of the intake valve 46 to establish a restricted flow of fluid from chamber 39 through the opening 55, duct 42 into the reservoir 26, this restriction to the flow of fluid resisting the movement toward the right of piston 35 and consequently resisting the upward movement of the axle 21.

As the piston moves toward the right, the fluid from reservoir 26 will move the intake valve 146 in the piston 36 from its seat to establish a substantially free flow of fluid through the piston duct 42 into the spring rebound control chamber 38.

The compressed spring 22 will tend to return toward the normal load position with a rebounding movement and as the spring 22 moves from frame 20, the link connections with the shock absorber piston 35 will move the piston toward the left to exert a pressure upon the fluid within the chamber 38, forcing said fluid from said chamber through duct or passage 60, opening 82 in sleeve 80 into the interior of said sleeve or more particularly chamber 87, from whence the fluid will pass through side openings 91 in the valve 84, into the interior chamber 90 of said valve flowing from said interior chamber 90 through openings 92 into the chamber 88, thence through openings 81 in sleeve 80, through cross passage 63 into recess 62, then through the orifice presented between the seat 107 and the tapered portion 106 of the adjustable valve 105, and from said recess 62 through the cross passage 64, the fluid pressure urging valve 68 from its seat to establish a flow into the valve chamber 65 from where the fluid will flow through the duct or passage 72 into the reservoir 26.

If the operator finds that too much restriction is being offered by the orifice provided by valve 105, lever 109 can be operated to screw valve 105 outwardly so as to increase the size of this orifice and thus reduce its restriction. If, on the other hand, the action of the shock absorber is too free, then the operator rotates lever 109 so that valve 105 is screwed into the recess 62 whereby the orifice between the tapered portion 106 of the valve and the seat 107 in the recess 62 will be reduced to increase fluid restriction by this orifice and thus increase shock absorber resistance.

The upward thrust of springs 22 upon compression, will tend to move the body 20 upwardly and, as the springs tend to return to normal load position and the wheels are on the roadbed, the thrust of the springs will tend to lift the vehicle body, carrying frame 20 upwardly at an accelerated rate which, when reaching a proper velocity, will cause a relative movement between the inertia mass control member 100 and the casing 25 of the shock absorber. This relative movement is similar to a downward movement of the weight 100 relative to the casing and thus sleeve 84 will be moved within the sleeve 80 so that the openings 91 in said sleeve valve are moved within the confines of the tubular bearing 85 within sleeve 80 covering said openings 91 and thus preventing any discharge of the fluid under pressure from the chamber 38 through duct or passage 60 and through opening 82 in the chamber 87, this chamber now being cut off from communication with the interior chamber 90 of the sleeve valve 84. Under these circumstances any fluid pressure release from chamber 38 must occur through the pressure release valve 152 which is movable relatively to the intake valve 146 in a manner similar as has been described in connection with the intake and pressure release valves 46 and 52 respectively of the piston head portion 37.

From the aforegoing it will be seen that the fluid flow from rebound chamber 38 is controlled primarily by the orifice provided by valve 105 and the static pressure release valve 69, however, in response to predetermined accelerations in the shock absorber movements upwardly, the inertia mass controlled valve 84 will become effective to render the other two fluid flow control devices inoperative or to render them ineffective, thus bringing into effect the pressure release valve 152 as sole fluid flow control device for the fluid being discharged from the chamber 38. Under these circumstances the highest degree of shock absorber resistance is offered inasmuch as valve 152 is provided with a comparatively heavy spring which urges it toward closed position.

In this invention applicant provides an hydraulic shock absorber which is not only capable of adjusting itself automatically in accordance with the nature of the roadbed over which the vehicle is being operated, but means is also provided whereby the operator may adjust the shock absorber as he desires. As presented, the automatic device will step in to adjust the shock absorber independently of the adjustment of the hand device, that is, if the hand device is operated to provide a soft ride or little resisting shock absorber, the automatic device may, if the roadbed requires, automatically adjust the shock absorber so as to provide a maximum amount of resistance. However, if the hand device is operated to provide a maximum amount of resistance, the shock absorber cannot be adjusted automatically to provide a soft ride, the automatic feature being operable only to provide a high degree of resistance if the nature of the roadbed necessitates such shock absorber control.

While the form of embodiment as herein disclosed constitutes a preferred form, it is to be understood that other forms might be adopted, all coming within the scope of the claims which follow.

What is claimed is as follows:

1. An hydraulic shock absorber having a fluid displacement chamber and a passage leading therefrom; a valve in said passage adapted to control the flow of fluid therethrough in response to accelerations in the movements of the shock absorber; and a member extending into said passage and providing a constant fluid flow orifice therein.

2. An hydraulic shock absorber having a fluid displacement chamber and a passage leading therefrom; a valve in said passage adapted to control the flow of fluid therethrough in response to accelerations in the movements of the shock absorber; and a manually adjustable member, accessible from outside the shock absorber, extending into the passage, and providing a constant fluid flow orifice therein.

3. An hydraulic shock absorber having a fluid displacement chamber and a passage leading therefrom; a valve in said passage adapted to discontinue the flow of fluid through said passage in response to accelerations in the upward movements of the shock absorber; and means in said passage providing a constant fluid flow orifice.

4. An hydraulic shock absorber having a fluid displacement chamber and a passage leading therefrom; a valve in said passage adapted to discontinue the flow of fluid through said passage in response to accelerations in the upward movements of the shock absorber; and adjustable means in said passage, having a portion accessible from outside the shock absorber, providing a constant fluid flow orifice within said passage.

5. An hydraulic shock absorber having a fluid displacement chamber and a passage leading therefrom; valves in said passage for controlling the flow of fluid therethrough, one adapted to be operated in response to fluid pressure, the other in response to accelerations in the movements of the shock absorber; and a manually adjustable valve in said passage between the aforementioned valves, providing a substantially constant fluid flow orifice.

6. An hydraulic shock absorber having a fluid displacement chamber and a passage leading therefrom; valves in said passage for controlling the flow of fluid therethrough, one normally closing said passage but adapted, in response to fluid pressure, to establish a restricted fluid flow therethrough, the other normally open, but adapted, in response to accelerations in the vertical movement of the shock absorber, substantially, completely to shut off the flow through said passage; and a valve accessible from outside the shock absorber for adjustment purposes, extending into said passage and providing a constant fluid flow orifice within said passage.

7. An hydraulic shock absorber having a fluid displacement chamber provided with two separate outlet passages; a pressure release valve for each passage, one valve requiring a greater fluid pressure to open it than the other; an inertia mass controlled valve in the passage with the lower pressure operating release valve, adapted to restrict fluid flow in said passage in response to predetermined accelerations in the upward movement of the shock absorber; and a manually adjustable member extending into said inertia controlled passage, providing a constant fluid flow orifice within said passage.

8. An hydraulic shock absorber having a fluid displacement chamber and a fluid passage leading therefrom; two automatic fluid flow control devices for said passage, one of said devices operating to control fluid flow in response to accelerations in the movements of the shock absorber in one direction; and a fluid flow control device adapted to be operated manually and accessible from outside the shock absorber, for regulating the flow of fluid through said passage.

9. An hydraulic shock absorber having a fluid displacement chamber and a fluid passage leading therefrom; three separate means in said passage for controlling the flow of fluid therethrough, one of said means operating in response to accelerations in the velocity of shock absorber movement in one direction, another operating in response to fluid pressure, and the third extending outside the shock absorber and being movable manually variably to restrict the flow of fluid through the passage.

10. An hydraulic shock absorber having a fluid displacement chamber and a fluid passage leading therefrom; a check valve normally closing the passage, but adapted, in response to fluid pressure, to establish a restricted flow of fluid therethrough; a normally open, inertia mass controlled valve adapted, in response to accelerations in the shock absorber movement in one direction, to completely shut said fluid passage and thus render the check valve ineffective; and a manually operated valve, accessible from outside the shock absorber, adapted to provide an adjustable orifice in the passage.

11. An hydraulic shock absorber having a fluid displacement chamber and a fluid passage leading therefrom; a spring loaded pressure release valve normally closing said passage; a slide-valve in the passage, normally maintaining its portion of the passage open, but adapted completely to close it; an inertia weight attached to said slide-valve; a spring yieldably holding said weight in suspended position to maintain the slide valve open; and a valve extending from outside the shock absorber into the passage, said valve being manually operable to provide an adjustable fluid flow restricting orifice in said passage.

12. An hydraulic shock absorber comprising a casing providing a cylinder in which a piston forms a compression chamber; two ports leading from said chamber; a pressure release valve for each port adapted, in response to fluid pressure, to establish flows of fluid from said chamber; an inertia mass controlled valve adapted to discontinue the flow established by the one pressure release valve, in response to accelerations in the shock absorber movement in one direction only; and a valve between the pressure release valve and inertia mass controlled valve, accessible from outside the shock absorber, and adapted to be operated manually to provide a variable orifice between said two valves.

13. An hydraulic shock absorber comprising a casing providing a cylinder in which a piston forms a compression chamber; ducts in the piston and casing providing separate outlets for said chamber; a pressure release valve for each outlet, one operating at a comparatively lower pressure than the other to establish its flow; an inertia mass controlled valve adapted, in response to accelerations in the shock absorber movements in one direction, to discontinue the flow established by the lower pressure release valve; and a valve, accessible from outside the shock absorber, and adapted to be operated to provide a variable fluid flow orifice in the passage between the low pressure release valve and inertia mass controlled valve.

14. An hydraulic shock absorber comprising a casing providing a cylinder in which a piston forms a compression chamber; ducts in the piston and casing providing separate outlets for said chamber; a pressure release valve for each outlet, the valve in the casing outlet operating at a lower pressure to establish a fluid flow, than the valve in the piston outlet; a normally open slide-valve in the passage leading to the lower pressure valve; an inertia weight attached to the slide valve; a spring yieldingly supporting said weight; and a valve in the casing passage, between the slide-valve and lower pressure valve, said valve being accessible from outside the shock absorber and manually operable to provide a variable orifice in said casing passage.

15. An hydraulic shock absorber having a fluid displacement chamber and a passage leading therefrom; a valve adapted to control the flow of fluid through said passage in response to accelerations in the movement of the shock absorber; and a manually adjustable valve for regulating the flow of fluid through said passage.

16. An hydraulic shock absorber having a fluid displacement chamber and a passage leading therefrom; a plurality of valves for regulating the flow of fluid through said passage; an inertia mass for adjusting one of said valves in response to accelerations in the movement of the shock absorber; and manually operable means for adjusting the other valve to vary its control of the fluid flow.

CARL H. KINDL.
EDWIN F. ROSSMAN.
RALPH I. BATES.